Aug. 16, 1949.                D. E. SUNSTEIN                2,479,051
                    ALTERNATING CURRENT TYPE LIMIT BRIDGE
Filed April 12, 1945                                    2 Sheets-Sheet 1
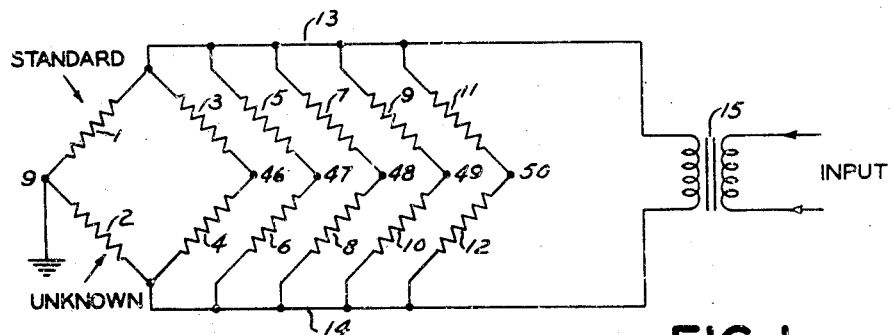
FIG. 1
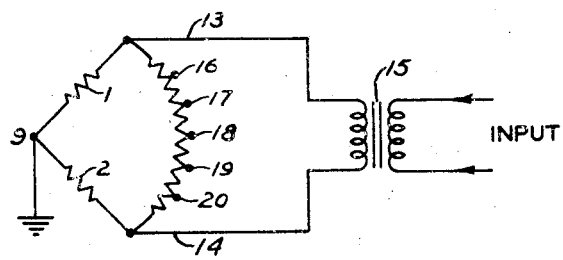
FIG. 2
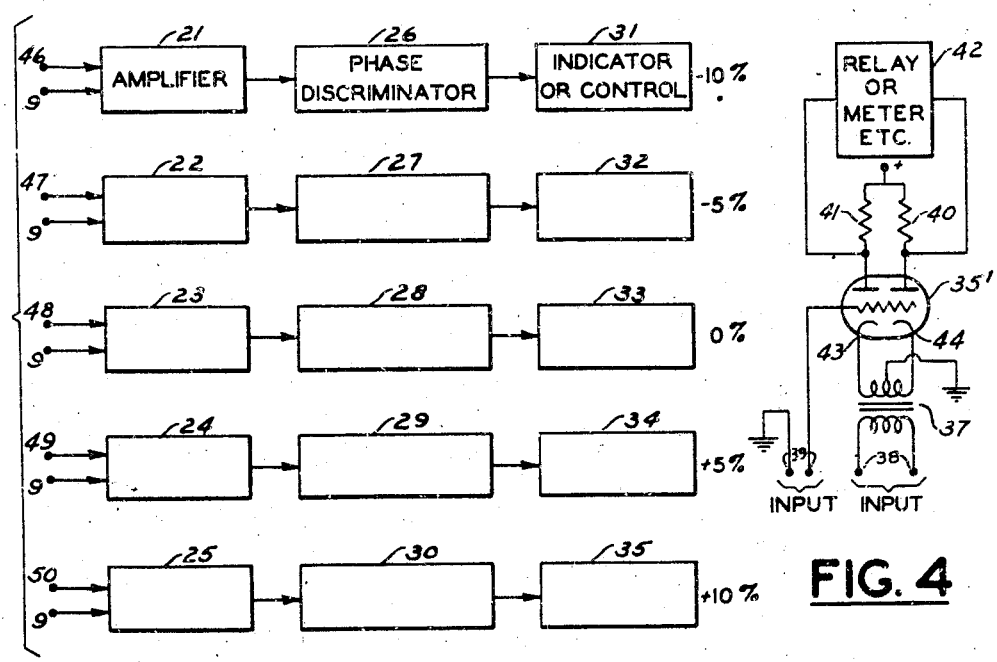
FIG. 3
FIG. 4
INVENTOR.
David E. Sunstein
BY
Ostrolenk and Faber
ATTORNEYS Aug. 16, 1949.   D. E. SUNSTEIN   2,479,051
ALTERNATING CURRENT TYPE LIMIT BRIDGE
Filed April 12, 1945   2 Sheets-Sheet 2

INVENTOR.
David E. Sunstein
BY
Ostrolenk and Faber
ATTORNEYS

Patented Aug. 16, 1949

2,479,051

UNITED STATES PATENT OFFICE 2,479,051

ALTERNATING CURRENT TYPE LIMIT BRIDGE

David E. Sunstein, Elkins Park, Pa., assignor to Philco Corporation, a corporation of Pennsylvania Application April 12, 1945, Serial No. 588,027

5 Claims. (Cl. 175—183)

My invention relates to the testing of electrical components. More particularly, it relates to the testing into tolerance classification of resistive, capacitive, or inductive components.

In my previous and co-pending patent applications Serial No. 576,065 and Serial No. 587,487 now Patent No. 2,468,843, issued May 3, 1949, I have described means for classifying electrical components such as resistors, capacitors, inductors, tubes, etc., into tolerance classifications, i. e., into classifications which are within certain percentages of a standard value.

Previous methods which I have described have employed either a relay sequencing system to test the component against each of the tolerance limits sequentially, or a system which employs no relay sequencing operations, but which is preferably employed for segregating components into no more than three classifications.

It is the purpose of this invention to provide a means for accurately and rapidly separating electrical components into more than three groups without the use of sequence relay systems. This invention provides a method of and means for testing the component against all of the tolerance limits simultaneously. This makes for a simpler mechanism and also for one which will operate more quickly than will one involving a sequence mechanism.

In this system a multiple limit bridge is fed from an input source. For each limit to be used there is a separate output or detector circuit for this bridge consisting of an amplifier, which may be omitted under certain circumstances, a phase discriminator, and an indicator or control.

These indicators or controls are arranged in such a manner that if the component being tested falls below the standard (multiplied by the ratio of the particular limit being used), the relay will have one action, whereas if the component under test falls above that value, the indicator or control will have an opposite action.

Thus, if indicators are used and these indicators are arranged side by side in ascending order of percentage limit, then all of those which represent values below the actual value of the unknown will give one reading, whereas all those which represent values above the actual value of the unknown will give the opposite reading.

Accordingly, it is easy to rapidly classify into which group the unknown lies, with an accuracy which is as great as the accuracy of the components employed in the bridge. Likewise, an automatic sorting mechanism may be operated by the indicators or controls, as by employing them to control the path of the tested components through a series of chutes, so that the resistor under test will proceed through the main chute as long as its value is on one side of the tolerance, and it then will be shunted off into an appropriate box when it reaches the value at which it changes from being on one side of a limit to being on the other side of a limit.

It thus becomes a purpose of my invention to have one reading on a multiple limit bridge separate or classify a resistor or other electrical components into proper percentage classification with respect to a standard.

This classification can be accomplished in any way which is desired, i. e., it can be indicated on a series of indicators. It can be recorded on a recording mechanism. It can be used to physically classify the resistors into appropriate boxes by sorting schemes, or any combination of these indicating and classifying schemes can be used. It can also be used in conjunction with the distribution curve production control device which I have described in my co-pending application Serial No. 588,026, filed concurrently herewith. The mechanism of operation of my invention is best described with respect to the following drawings, in which:

Figure 1 shows one form of a multiple limit bridge;

Figure 2 shows a modified form of a multiple limit bridge;

Figure 3 shows the series of amplifiers, phase discriminators and indicators or controls in block diagram form;

Figure 4 shows one of the phase discriminators;

Figure 5:
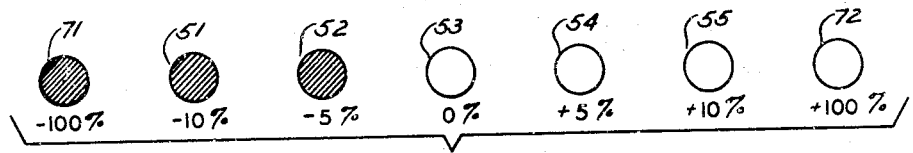
Figure 5 shows a possible arrangement of indicator lamps.

Considering my invention as applied to the testing and sorting of resistors, and making reference to Figure 1, the standard against which the unknown is to be compared is arm 1 of the multiple limit bridge. The unknown is arm 2 of this bridge.

Power is fed into the bridge through transformer 15 and can come from any convenient signal source such as 1,000 cycles or 60 cycles. The junction 9 of the bridge may be grounded. The various tolerance limits are set up by resistor combination such as 3—4, 5—6, or 7—8, or 9—10, or 11—12.

As an example, to study the operation of this type of bridge, assume that resistor arm 7—8 form a unity ratio, that is, resistor 7 is equal to resistor 8. Thus if the unknown is the same value as the standard, the potential between the terminals 9 and 48 is zero. If the unknown is larger than the standard, the potential at terminal 9 is closer to line 13 than it is to line 14. Thus, in vector terminology, the potential from 9 to 48 is in the same phase as the potential from 13 to 14. If, however, the unknown resistor were smaller than the standard, the opposite phase condition would exist. This arises because under these circumstances, terminal 9 is closer to terminal 14 than it is to terminal 13, and, consequently, the potential difference from 9 to 48, in vector terminology, would be out of phase 180 degrees with the potential from line 13 to line 14.

Thus, if the potential from line 13 to line 14 is chosen as the standard phase reference, the following conditions obtain: When the unknown is higher than the ratio set up by the tolerance limit arms (in this case arms 7 and 8), the output potential of the bridge has a zero phase angle, and when the unknown resistor is smaller than the appropriate tolerance, the output potential of the bridge has a negative phase angle, that is, a phase angle of 180 degrees.

To further the example, consider that resistor arms 5—6 are set up to establish a minus 5% tolerance; i. e., the ratio of the resistance of resistor 6 to that of resistor 5 is 0.95. Under these circumstances then, if the unknown resistor is larger than .95 times the standard, i. e., larger than 5% below the standard, the phase from 9 to 47 is zero. Likewise, if the unknown is smaller than .95 times the standard, the phase angle of the voltage from 9 to 47 is 180 degrees.

To further carry out the specific application indicated here, reference will be made to the resistance value of a resistor indicated in the figure by a given reference numeral $n$ as R—$n$. Thus the resistance of resistor 3, for example, will be designated as R—3. Thus, R—3 and R—4 may be selected such that the ratio of R—4 to R—3 is 0.90, so that when the unknown is 0.90 times the standard, balance from terminal 9 to terminal 46 is achieved. If the unknown is larger than .90 times the standard, the potential from terminal 9 to terminal 46 has zero phase angle, and if the unknown is smaller than .90 times this standard, the potential from 9 to 46 has a 180 degree phase angle.

In a similar manner, R—10, divided by R—9 is set to be 1.05. Thus, if the unknown is higher than 1.05 times the standard, the potential from 9 to 49 has zero phase angle, whereas if resistor 2 (that is, the unknown) is below 1.05 times the standard, the potential from 9 to 49 has a 180 degree phase angle.

Finally, in this example, resistors 12 and 11 are so chosen that R—12 divided by R—11 equals 1.10. Thus, if the unknown resistor is higher than 1.10 times the standard, the potential from 9 to 50 has a zero phase angle, whereas if the unknown is below 1.10 times the standard, the potential from 9 to 50 has a 180 degree phase angle. Thus, terminal 46 balances at −10%, terminal 47 balances at −5%, terminal 48 balances at 0% tolerance, terminal 49 balances at +5% tolerance, and terminal 50 balances at +10% tolerance.

In the examples to be worked out throughout this description, it will be considered that the resistor under test lies between zero and −5% tolerance. Thus, in this bridge the phases from 9 to 46 and from 9 to 47 are 0 degree, whereas the phases from 9 to 49, from 9 to 48 and from 9 to 50 are 180 degrees for such a resistor which lies between zero and −5% tolerance.

It is to be observed that in the above description of the multiple limit bridge, the quality which determines whether resistor under test is too high or too low is the phase angle. Thus, it becomes necessary to have a device sensitive to phase angle.

Such a device is a phase discriminator, and the application of the phase discriminator to the indicating and control circuit is shown in Figure 3. Here each one of the multiple limit bridge output signals is supplied to an amplifier.

Thus, the signal at terminals 9 and 46 is introduced into the input of amplifier 21. The signal at terminals 9 and 47 is introduced into amplifier 22; 9 and 48 into amplifier 23; 9 and 49 into amplifier 24; and 9 and 50 into amplifier 25.

It will be noticed in all of this that terminal 9 is a common terminal to all parts of the limit bridge. This means, of course, that terminal 9 can conveniently be a grounded terminal. This is a preferred method of operation.

The output of these several amplifiers is individually fed into phase discriminators 26, 27, 28, 29 and 30; and the output of these phase discriminators is fed independently into the indicator or control circuits 31, 32, 33, 34 and 35. Thus, the amplifier 21, phase discriminator 26, indicator or control circuit 31, all function with that part of the bridge which gives the −10% limit.

Accordingly, I provide five indicator or control circuits, each one responsive at a certain definite tolerance limit, set by the resistors in the multiple limit bridge and each one independent of the other.

The basic principle of the phase discriminator may be described as follows: When the phase of the input has one value compared to a reference phase, the output of the phase discriminator is of one character; whereas when the phase of the input is of reverse value to the reference phase, the output of the phase discriminator has an opposite character.

In one embodiment of my invention, I provide a light source as the indicator with circuits so arranged that the phase discriminator causes the light to be turned on if the phase input through the phase discriminator is the same as the reference phase. Likewise, the application of a signal input to the phase discriminator which is opposite in phase from the phase of the reference will cause no light to appear on the indicator or control.

The appearance of such an indicator panel is shown in Figure 5, where the circles 51, 52, 53, 54 and 55 represent the bull's eyes or lamps corresponding to the indicators 31, 32, 33, 34 and 35. In the example cited above, namely that the resistance of test resistor lies between zero and −5%, the phases impressed on amplifiers 21 and 22 are in phase with the reference phase. Thus the phase input to the phase discriminators is in phase with the reference phase, assuming that the amplifiers themselves have substantially zero phase shift. Accordingly, in Figure 5 lamps 51 and 52 are illuminated.

In accordance with the mechanism of operation of the bridge described above, the input through amplifiers 23, 24 and 25 is out of phase with the reference phase, and thus indicators 33, 34 and 35 are not operated and lamps 53, 54 and 55 are not illuminated. Thus the appearance of the indicator panel would be that the lamps 51 and 52 would be illuminated whereas the lamps 53, 54 and 55 would be dark. A visual indication is thus provided showing that the resistor under test falls between the —5% lamp and the 0% lamp, since that is the boundary between the illuminated lamp and the non-illuminated lamp.

This system thus far described operates with the above described visual indication classification method for all values of the resistor under test, unless the resistor under test should fall below —10% or above 10%. Under these circumstances an operator might have difficulty in readily deciding which one of the two was the proper classification for the resistor. Consequently, the lamp 71 and 72 may be added to the bank. Lamp 71 is continuously illuminated and lamp 72 is continuously out. If a resistor should fall below —10% the lamp 71 will always show the boundary of the position of the resistor. Likewise, if a resistor should fall above +10%, the lamp 72 will be out, but all the rest of the lamps will be illuminated and it will be obvious that the resistor value is above the +10% value.

Figure 6:
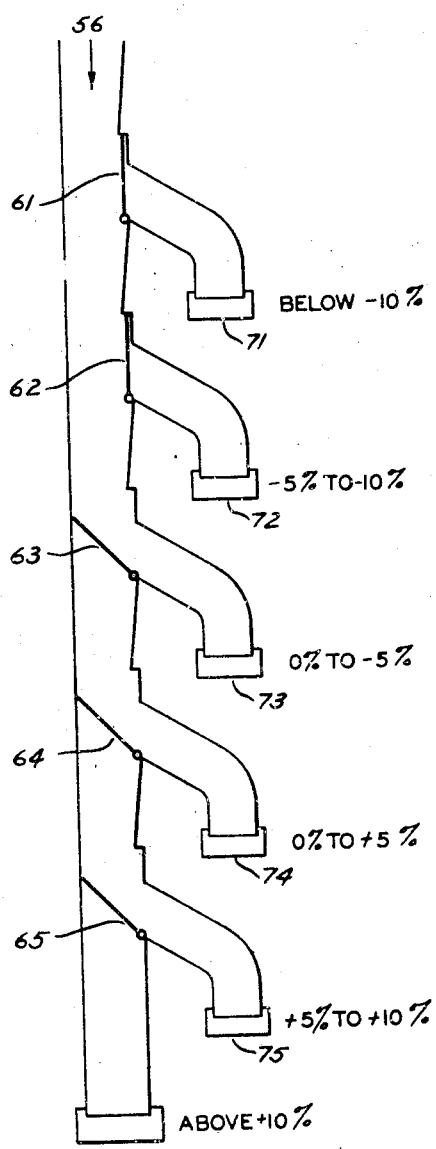
Figure 6 shows a possible chute arrangement for classifying into boxes the resistors under test.

Still another way by which the indication of the phase discriminators may be used to advantage is shown in Figure 6. This represents a form of classification chute. Resistors entering top 56 fall vertically down the chute until they strike a trap door obstruction such as 63. When they strike such an obstruction, they are shunted off into a side chute and in this case fall into the box 73. The control of the trap door is obtained from the phase discriminator through the indicator or control circuit.

In the specific example which we have cited above, the resistor falls between —5% and 0. Thus, the phase of the signals from terminals 9 to 46 and 9 to 47 is zero. Consequently, the phase discriminators 26 and 27 energize the indicator or control circuits 31 and 32. These circuits cause the trap doors 61 and 62 to be lifted into the vertical position. However, the phase of potential from terminals 9 to 48, 9 to 49, and 9 to 50 is 180°, and consequently phase discriminators 28, 29 and 30 have such an output that indicator or control mechanisms 33, 34, and 35 are non-operative and consequently trap doors 63, 64 and 65 are allowed to remain across the chute. Since the component in falling down the chute first hits trap door 63, it will be deflected into the corresponding chute and into receiver box 73 which is labelled 0 to —5%. The fact that trap doors 64 and 65 have not been closed is immaterial to this application. However, it is seen that by this simple scheme, no matter where the resistor value falls, the appropriate trap doors will be operated, so that the resistor will fall vertically through the chute until it reaches the first trap door which is non-operated. This first trap door will be used then to shunt the resistor into the appropriate receptacle box.

One type of phase discriminator which can be used is shown in Figure 4. Here the double triode 35' has a signal fed to its grids by the signal supplied to terminals 39 by the output of one of the amplifiers 21, 22, 23, 24, or 25 with which it is associated. The reference input phase is supplied through transformer 37 and input terminals 38. The signal supplied to terminals 38 is therefore the same as the signal fed to transformer 15 of Figure 1, or derived therefrom through a phase shifting network having the same phase shift as is introduced by the amplifier 21, 22, 23, 24, or 25 which feeds terminals 39. The voltage in the secondary of transformer is applied to the two cathodes of the tube.

With no signal at all on the grid, both cathodes have the same signal impressed, although the signal on one cathode is 180 degrees out of phase with the signal at the other cathode. These signals are sufficiently large to operate the tube over a curved portion of its characteristics, and preferably they cause alternate plate current cut off of the two triodes. As a result, in the absence of a signal at terminals 39, the D. C. components of current through the two tubes are equal, and, likewise, the D. C. components of current through resistors 41 and 40 are equal. Consequently no D. C. component of current flows through relay or meter or lamp 42. When, however, a signal comes into the grid of this tube which is in phase with the signal on one of the cathodes, for example, cathode 43, it is seen that the variation in potential between the grid and cathode 43 becomes less than it was previously. However, the grid cathode potential for cathode 44 becomes larger than it was before, since these two are out of phase. Thus, when the grid goes positive, the cathode 44 goes negative, and so the potential difference between them is considerably increased over what it was before.

If now, even with a current limiting resistor used in the grid circuit so that when the grid goes positive with respect to the cathode there is limiting action, the plate current in resistor 40 will nevertheless be less than the plate current in resistor 41, because the left half triode has zero plate current for a smaller part of the A. C. cycle than the right half. Consequently, a D. C. component of current will flow from left to right through relay or indicator 42.

If the circumstances are reversed, i. e., if the input 39 is in phase with the input to the cathode 44 and out of phase with the input to the cathode 43, then current will flow from right to left through the relay or indicator 42. Thus, the distinction between a zero or a 180 degree phase angle in the original multiple limit bridge is a distinction in direction of current through relay 42. Relay 42 may be a polarized relay or solenoid which operates with only one direction of current and does not operate with the other direction of current. Alternatively, if the phase discriminator is to control a lamp, such a lamp may be connected in the circuit as indicator 42. In this case the lamp is of the polarized type, such as a neon glow lamp, one electrode of which is either rendered inactive or else hidden from the eye of the observer. It is also preferable to provide a by-pass condenser across this indicator, so that voltages of signal frequency cannot be impressed thereacross to cause the incorrect electrode to glow.

Amplifiers 21, 22, etc. can be used to raise the level of voltage applied to the phase discriminator to such a height that there is no question but what there is a distinct operation of the phase discriminator itself. If tube 35 is a fairly large tube, i. e., with a fairly large rating, it is possible to pass sufficient current through relay coil 42 so that this relay operates as a solenoid directly on the trap doors of Figure 6.

To obtain an even more useful testing system, this testing circuit may be combined with an automatic feed circuit such as is shown in my patent application Serial No. 587,487 filed April 10, 1945. Such a combination would be completely automatic, so that resistors could be fed in, tested and chuted into the appropriate collector boxes in Figure 6 at a very rapid rate.

Figure 2 shows an alternative way of setting up the limit bridge of Figure 1. Here a single tapped resistor is used to give terminal points 16, 17, 18, 19 and 20. These terminal points provide the tolerance limits, and correspond in function to terminals 50, 49, 48, 47, and 46 respectively. Thus, terminal 18 corresponds to a 1:1 ratio. Terminal 19 corresponds to a .95 ratio. Terminal 20 corresponds to a .90 ratio. Terminal 17 corresponds to a 1.05 ratio and terminal 16 corresponds to a 1.10 ratio in the example which I have used. This is an alternative way of setting up the limit bridge of Figure 1 and may have certain advantages in its own right. For example, with a single resistor properly made and properly tapped, it is possible to use this resistor as a plug-in unit. This unit may be pulled out and another one inserted, thus, the changing of the tolerance ranges would be a very simple matter, simply plugging in an appropriate resistor into the multiple limit bridge. The circuit of Figure 1 requires almost twice as many resistive elements as Figure 2, and hence is relatively more complex. However, the circuit of Figure 1 is able to provide continuously adjustable limits by employing ordinary potentiometers for resistor 3—4, 5—6, 7—8, 9—10, and 11—12. The circuit of Figure 2 requires for such application, the use of a special multi-contact potentiometer. Therefore, since there are advantages in either one of these circuits, they are both to be considered as alternative circuits for my invention.

Thus the principal objective of my invention is to provide a multiple limit bridge and means for determining the indication of this multiple limit bridge without a sequence mechanism and to provide such a multiple limit bridge which will operate on any number of tolerance ranges. I have, however, in the above description used a specific example of a resistive bridge to explain my invention. Since obviously the same method may be employed in a system for testing inductance, capacitance, potential, frequency, etc., or a combination thereof, I would prefer that my invention be described by the following claims.

I claim:

1. A Wheatstone bridge circuit comprising: means consisting of impedances connected to each other providing a plurality of pairs of ratio arms of different ratios; a single standard impedance, one end of which is connected to one end of each of said pairs of ratio arms; a pair of terminals suitable for connection to an unknown impedance to be measured, one of said terminals being connected to the other end of said standard impedance, the other of said terminals being connected to the other end of each of said pairs of ratio arms; a source of alternating voltage, connected to the ends of said ratio arms; a plurality of thermionic phase detectors, each phase detector being individually associated with each of said pairs of ratio arms; connections connecting one side of each said phase detectors to the terminal for the unknown impedance which is connected to the standard impedance; connections connecting the other side of each said phase detectors to the junction between the arms of associated pairs of ratio arms; means for supplying alternating voltage of predetermined phase with respect to the voltage from said source, to all of said phase detectors; and indicating means, connected to said phase detectors, for indicating the relation between the phase of the voltage at said junctions and said predetermined phase.

2. A Wheatstone bridge circuit comprising: means consisting of impedances connected to each other providing a plurality of pairs of ratio arms of different ratios varying from unity to predetermined ratios above and below unit; a single standard impedance, one end of which is connected to one end of each of said ratio arms; a pair of terminals suitable for connection to an unknown impedance to be measured, one of said terminals being connected to the other end of said standard impedance, the other of said terminals being connected to the other end of each of said ratio arms; a source of alternating voltage, connected to the ends of said ratio arms; a plurality of thermionic phase detectors, each of said phase detectors being individually associated with each of said pairs of ratio arms; connections connecting one side of each said phase detector to the terminal for the unknown impedance which is connected to the standard impedance; connections connecting the other side of each said phase detectors to the junction between the arms of associated ones of said pairs of ratio arms; means for supplying alternating voltage, of predetermined phase with respect to the voltage from said source, to all of said phase detectors; and indicating means, connected to said phase detectors, for indicating the relation between the phase of the voltage at said junctions and said predetermined phase.

3. A Wheatstone bridge circuit comprising: means consisting of impedances connected to each other providing a plurality of pairs of ratio arms of different ratios varying from unity to predetermined ratios above and below unity; a single standard impedance, one end of which is connected to one end of each of said ratio arms; a pair of terminals suitable for connection to an unknown impedance to be measured, one of said terminals being connected to the other end of said standard impedance, the other of said terminals being connected to the other end of each of said ratio arms; a source of alternating voltage, connected to the ends of said ratio arms; a plurality of thermionic phase detectors, each comprising a pair of tubes and each pair of tubes being individual to and associated with one of said pairs of ratio arms and each of said tubes having an input and output; connections connecting one side of the input of each said pairs of tubes to the terminal for the unknown impedance which is connected to the standard impedance; connections connecting the other side of the input of each of said pairs of tubes to the junction between the arms of one of said pairs of ratio arms; means for supplying alternating voltage, of predetermined phase with respect to the voltage from said source to the output of all of said pairs of tubes; and indicating means connected to said phase detectors, for indicating the relation between the phase of the voltage at said junctions and said predetermined phase.

4. A Wheatstone bridge circuit comprising: means consisting of impedances connected to each other providing a plurality of pairs of ratio arms of different ratios varying from unity to predetermined ratios above and below unity; a single standard impedance, one end of which is connected to one end of each of said ratio arms; a pair of terminals suitable for connection to an unknown impedance to be measured, one of said terminals being connected to the other end of said standard impedance, the other of said terminals being connected to the other end of each of said ratio arms; a source of alternating voltage, connected to the ends of said ratio arms; a plurality of thermionic phase detectors, each comprising a pair of tubes and each pair of tubes being individual to and associated with one of said pairs of ratio arms and each of said tubes having an input and output; connections connecting one side of the input of each said pairs of tubes to the terminal for the unknown impedance which is connected to the standard impedance; connections connecting the other side of the input of each of said pairs of tubes to the junction between the arms of one of said pairs of ratio arms; means for supplying alternating voltage, of predetermined phase with respect to the voltage from said source, to all of said phase detectors; and indicating means connected in the output of each of said tubes for indicating the relation between the phase of the voltage at said junctions and said predetermined phase.

5. A Wheatstone bridge circuit comprising: means consisting of impedances connected to each other providing a plurality of pairs of ratio arms of different ratios; a single standard impedance, one end of which is connected to one end of each of said ratio arms; a pair of terminals suitable for connection to an unknown impedance to be measured, one of said terminals being connected to the other end of said standard impedance, the other of said terminals being connected to the other end of each of said ratio arms; a source of alternating voltage, connected to the ends of said ratio arms; an amplifier individual to and associated with each of said pairs of ratio arms, each amplifier having an input and output side; a thermionic phase detector individual to and associated with each of said pairs of ratio arms, each detector having an input and output side; connections connecting the input side of each said amplifier to the terminal for the unknown impedance which is connected to the standard impedance and to the junction between the arms of the associated pair of ratio arms; circuit connections for connecting the output side of each amplifier to the input side of its associated phase detector; means for supplying alternating voltage, of predetermined phase with respect to the voltage from said source, to the output side of all of said phase detectors; and indicating means individual to and associated with each of said phase detectors, each of said indicating means being connected in the output of its associated phase detector for indicating the relation between the phase of the voltage at said junctions and said predetermined phase.

DAVID E. SUNSTEIN.

REFERENCES CITED

The following references are of record in the file of this patent:

UNITED STATES PATENTS

| Number | Name | Date |
| --- | --- | --- |
| 701,453 | Zellers | June 3, 1902 |
| 1,324,818 | Hazard | Dec. 16, 1919 |
| 1,743,386 | Paulson | Jan. 14, 1930 |
| 1,921,788 | Suits | Aug. 8, 1933 |
| 1,931,054 | Butterfield | Oct. 17, 1933 |
| 1,951,461 | Wilson | Mar. 20, 1934 |
| 2,246,575 | Coleman | June 24, 1941 |
| 2,257,471 | McGrath | Sept. 30, 1941 |
| 2,293,502 | Herman | Aug. 18, 1942 |

FOREIGN PATENTS

| Number | Country | Date |
| --- | --- | --- |
| 26,639 | British | 1912 |